(12) United States Patent
Viale

(10) Patent No.: US 6,484,972 B1
(45) Date of Patent: Nov. 26, 2002

(54) ARTICULATED SET OF SEQUENTIALLY OPENED SOLAR GENERATOR PANELS

(75) Inventor: Daniel Viale, Tanneron (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 10/126,660

(22) Filed: Apr. 22, 2002

Related U.S. Application Data

(63) Continuation of application No. 09/666,387, filed on Sep. 20, 2000.

(30) Foreign Application Priority Data

Nov. 4, 1999 (FR) .............................................. 99 13797

(51) Int. Cl.[7] .............................. B64G 1/00; E06B 3/48
(52) U.S. Cl. .................. 244/158 R; 244/173; 136/245; 136/292; 160/32; 160/62; 160/130; 160/138; 160/188
(58) Field of Search ............................. 244/173, 158 R; 136/245, 292; 160/32, 62, 130, 138, 188

(56) References Cited

U.S. PATENT DOCUMENTS

| | | |
|---|---|---|
| 5,319,905 A | 6/1994 | Szirtes |
| 5,400,987 A | 3/1995 | Ziavras |
| 5,509,747 A | 4/1996 | Kiendl |
| 5,810,296 A | 9/1998 | Izumi |
| 5,909,860 A | 6/1999 | Lee |
| 5,911,536 A | 6/1999 | Roth |
| 6,010,096 A * | 1/2000 | Baghdasarian ............... 160/135 |
| 6,284,967 B1 * | 9/2001 | Hakan et al. ................ 136/245 |
| 6,321,819 B1 * | 11/2001 | Copp et al. .................... 160/35 |
| 6,360,927 B1 * | 3/2002 | Barker ......................... 223/37 |

FOREIGN PATENT DOCUMENTS

| | | |
|---|---|---|
| FR | 2 768 400 A1 | 3/1999 |
| FR | 2 776 984 A1 | 10/1999 |
| FR | 2 781 454 A1 | 1/2000 |

* cited by examiner

Primary Examiner—J. Woodrow Eldred

(57) ABSTRACT

At least three stacked panels are articulated by means of adjacent members so that they can pivot toward a deployed configuration. A mechanism includes an immobilizer mounted on a first member, cooperating with a second member to lock the two panels in the deployed configuration and constrained to rotate with a lug which can rotate on the first member and is abutted against a surface of a member constrained to rotate with the second member and configured so that, when the deployed configuration is reached, the lug escapes from it and brings the immobilizer into contact with the second member to bring about locking. A first finger of the mechanism, which is constrained to rotate with the lug, cooperates with a second finger of the third panel to hold it stacked until the two panels reach the deployed configuration, at which time rotation of the lug releases the second finger.

15 Claims, 2 Drawing Sheets

ARTICULATED SET OF SEQUENTIALLY OPENED SOLAR GENERATOR PANELS

This is a continuation of application Ser. No. 09/666,387, pending filed Sep. 20, 2000; the disclosure of which is incorporated herein by reference.

BACKGROUND OF THE INVENTION

1. Field of the Invention

The present invention relates generally to deploying solar generator panels on a spacecraft such as a satellite in orbit around the Earth.

2. Description of the Prior Art

The expression "solar generator panel" refers to the set of plane structures of a solar generator having optical, thermal or photovoltaic active surfaces, and in particular:

- panels supporting an array of identical or different photovoltaic cells converting solar energy into electrical energy,
- reflector panels concentrating solar radiation onto the previous panels by means of a coating with appropriate properties, and
- panels used for their thermo-optical surface characteristics (heat dissipators).

The panels of a thermal generator can be deployed in highly diverse configurations. Conventionally they form a longitudinal succession, parallel to a direction away from the body of the spacecraft, and around which the generator is adapted to turn to track the Sun. It has been proposed to provide additional lateral panels, over and above the panels previously referred to, to increase the available electrical power. There are also configurations known in the art in which the panels are disposed along a transverse direction, i.e. a direction which is transverse to the aforementioned longitudinal direction of the yoke connecting the generator to the body of the spacecraft, and around which the generator is adapted to turn to track the Sun.

During launch, the generator is folded and its panels are stacked in what is referred to as a stacked or stacking configuration.

Commissioning of the generator, for example when the spacecraft is a satellite and has reached its working orbit, involves unfolding the stack of panels, which is referred to as unstacking.

To go from the stacking configuration to the deployed configuration, in which the solar panels are in substantially the some plane, the panels are articulated two-by-two, either by means of articulations having adjacent members articulated about a pivot axis and each fastened to one of two adjacent panels, or by means of articulations connecting the parallel edges of panels, of the type described in the document FR-A-2 635 077.

The first-mentioned articulations are generally used to connect the panels of the aforementioned longitudinal succession (in-line panels). The articulations described in the document FR-A-2 635 077 are generally used to connect the lateral panels to the in-line panels.

In order to be able to lock the in-line panels in the deployed configuration, the panel articulations are generally provided with a locking mechanism including rotary immobilizing means mounted on a first of the two adjacent members and cooperating with the second of the two adjacent members to lock the corresponding two panels in the deployed configuration of the two panels. The immobilizing means are constrained to rotate with a lug which can rotate on the first of the adjacent members and temporarily locked against rotation by being abutted against a peripheral surface of a member constrained to rotate with the second of the two adjacent members. The peripheral surface has a configuration such that when the corresponding two panels reach the deployed configuration the lug escapes from the peripheral surface and pivots until the immobilizing means come into contact with the second of the two adjacent members in order to lock the two panels in the deployed configuration.

To prevent the panels colliding and being damaged during deployment, which could compromise the remainder of the mission of the spacecraft, a precise sequence of operations must be defined and carried out precisely.

In particular, the side panel or panels must not be released until the corresponding in-line panels have been locked in the deployed configuration, as this could impede the locking of those panels and cause disruptive impacts.

At present the sequence of operations is achieved in particular by synchronized deployment using pulley and cable conjugation systems. The use of cables can however constitute a single failure source, for example if the cables become jammed, with no possibility of redundancy. What is more, synchronized deployment of the various movements may prove difficult to achieve.

Another solution known in the art is to provide an electrical sequence using pyrotechnics devices on the successive panels whose function is to break links holding the panels in the stacking configuration. This solution has the drawback that the firing of such devices is generally a source of pollution affecting the subsequent performance of the panels and a source of sudden vibrations such that the panels and the connections between them must be highly rigid, which makes them heavy. Pyrotechnic mechanisms also require the use of command transmission cables which generate high cable resisting torques. Finally, pyrotechnics devices are generally heavy and bulky.

Consequently, the object of the present invention is to propose a mechanical (and therefore non-polluting) device for sequencing the deployment of one panel relative to other panels, in particular of a side panel relative to in-line panels, that is simple and therefore reliable, compact in size and light in weight, and has no significant resisting torque to that of the articulations linking the panels.

SUMMARY OF THE INVENTION

To this invention, the invention proposes an articulated system formed of at least three adjoining panels of a solar generator, articulated two-by-two to be able to pivot from a stacking configuration, in which the panels are stacked, to a deployed configuration, in which the panels are disposed in substantially the same plane, wherein two of the panels are connected together by at least one articulation having two adjacent articulated members each fastened to one of the two panels, a locking mechanism is mounted on the articulation and includes rotary immobilizing means mounted on a first of the two adjacent members and cooperating with the second of the two adjacent members to provide at least one-way non-return locking of the two panels relative to each other in the deployed configuration, the immobilizing means are constrained to rotate with a lug rotatably mounted on the first of the two adjacent members and temporarily locked against rotation by being pressed against a peripheral surface of a member constrained to rotate with the second of the two adjacent members, the peripheral surface has a configuration such that, when the deployed configuration of the two panels is reached, the lug escapes from the peripheral surface and pivots to bring the immobilizing means into contact with the second of the two adjacent members in order to lock the two panels in their mutual deployed configuration, and the locking mechanism further includes a first finger constrained to rotate with the lug and cooperating with a second finger fastened to the third panel to retain the third panel stacked on one of the two panels during movement of the two panels to the mutual deployed configuration, rotation of the lug on reaching the deployed configuration releasing the second finger and thereby enabling the third panel to move to a deployed configuration relative to the two panels after deployment of the first two panels.

A mechanical device having the advantages mentioned above can therefore achieve in-line and side panel deployment kinematics such that a side panel can open only if the two in-line panels are locked in the deployed position.

A system of the above kind could if required be transposed to the deployment of in-line panels relative to each other, for example.

In accordance with preferred, and possibly combined, features of the invention:

the peripheral surface is a cylindrical surface portion of a member adapted to rotate about a pivot of the two adjacent members, the immobilizing means, the lug and the first finger are rotatable about a pivot substantially parallel to the articulation axis, the second finger is fixed to a fitting mounted on and projecting from the third panel, there is a clearance between the two fingers in the stacking configuration.

The present invention also proposes a spacecraft equipped with a solar generator formed of a plurality of panels including a deployment system in accordance with the invention.

The present invention will now be described in more detail with reference to the accompanying drawings.

DETAILED DESCRIPTION OF THE PREFERRED EMBODIMENT

FIGS. 1 to 4 are very diagrammatic representations of part of an articulated system 10 formed of four panels forming part of a solar generator.

For simplicity, the figures do not show the remainder of the panels of the solar generator or how the generator is fixed to a spacecraft body by means of a yoke.

The system 10 includes four deployable rigid panels 1 to 4.

Figure 1:
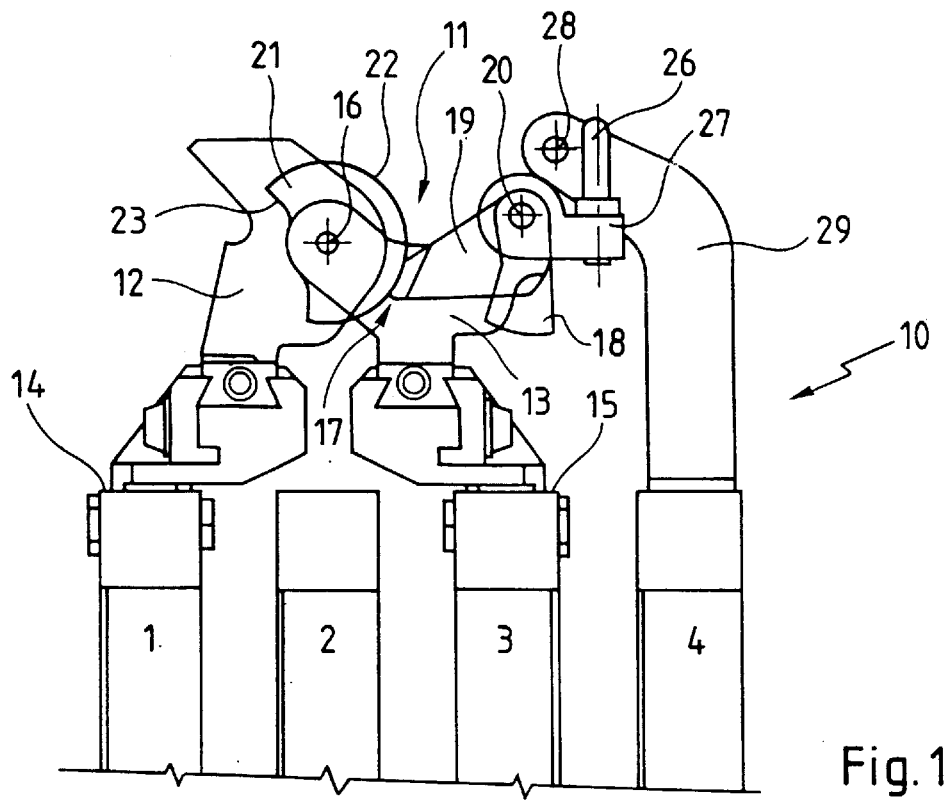
FIGS. 1 to 3 are highly diagrammatic views of the deployment kinematics of an articulated system in accordance with the present invention.
Figure 2:
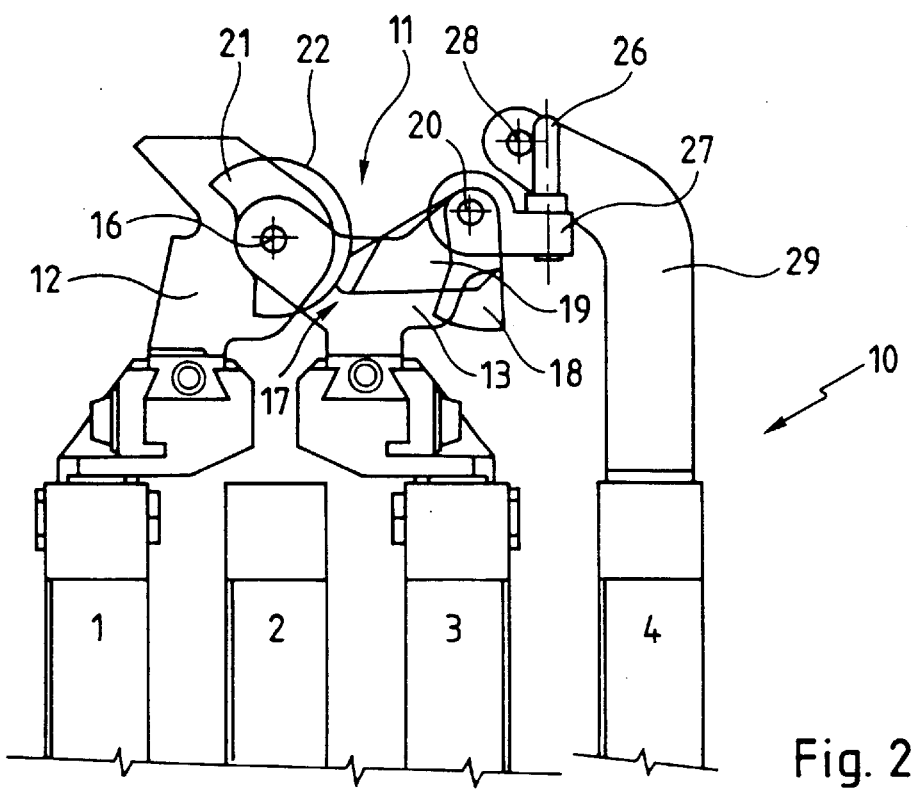
Figure 4:
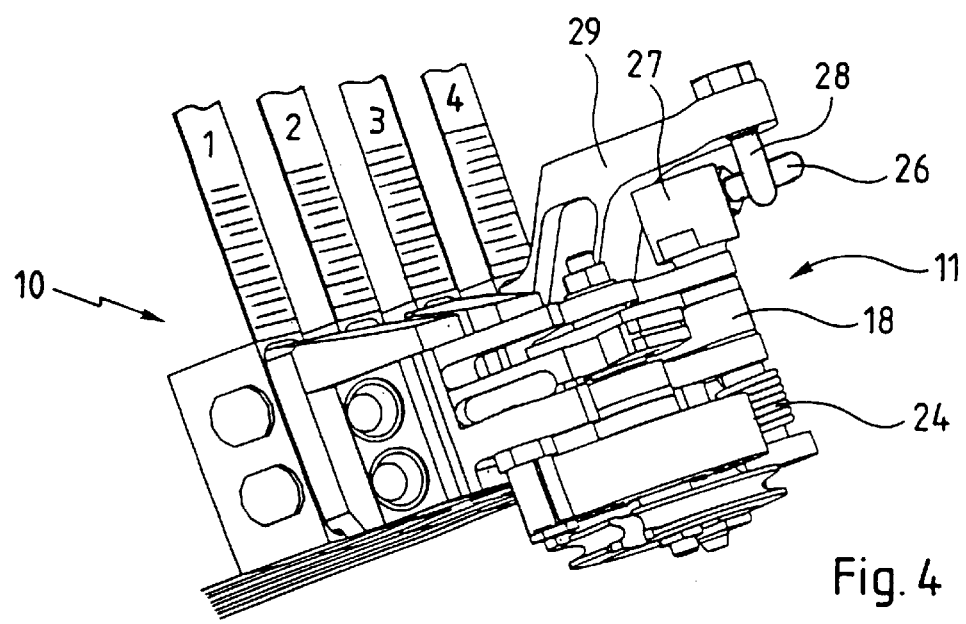
FIG. 4 is a perspective view of the same system.

The panels are articulated two-by-two so that they can pivot from a stacking configuration shown in FIGS. 1, 2 and 4, in which the panels are stacked, to a deployed configuration, in which the panels are in substantially the same plane.

In the embodiment described with reference to FIGS. 1 to 4, the panels intended to form a longitudinal succession of panels (in-line panels) are the panels 1 and 3. They are articulated two-by-two by means of articulations having two adjacent members articulated about a pivot axis and each of which is fastened to one of two parallel edges of adjacent panels. The articulations are powered (for example spring-loaded by a coil spring) to deploy the panels that they connect and there are two articulations for each pair of parallel edges.

The side panels are connected to the in-line panels by means of articulations connecting the parallel edges of the panels, which are of the type described in the document FR-A-2 635 077. In this example the side panels are the panels 2 and 4 and the in-line panel is the panel 3.

The parallel edges just referred to are perpendicular to the parallel edges at which the in-line panels are connected together.

Briefly, the articulation described in the patent FR-A-2 635 077 comprises two fittings adapted to roll one on the other via two cylindrical surfaces. Rolling is guided by flexible members such as rolling leaf springs whose ends are fixed to the fittings and which cross over between the cylindrical surfaces. Tensioning means are also provided to preload each of the flexible members in traction to prevent any unwanted movement between the fittings. The torque for automatically deploying the articulation and locking it at the end of its travel is provided by spring strips connecting the two fittings and each formed of two superposed leaf springs. The articulations are not shown in the figures.

The articulation 11 of the in-line panels 1 and 3 includes a male yoke 12 and a female yoke 13 forming the two adjacent members previously referred to. The male yoke is fixed to an edge 14 of the panel 1 and the female yoke 13 is fixed to an edge 15 of the panel 3. The yokes 12, 13 are articulated about a pivot 16 substantially parallel to the longitudinal direction of the edges 14, 15.

A locking mechanism 17 is mounted on the articulation 11.

The locking mechanism 17 includes a logarithmic pawl 18 which has a lug 19 rotatably mounted on the female yoke 13 to rotate about a pivot 20 substantially parallel to the pivot 16 and a member 21 constrained to rotate with the male yoke 12 about the pivot 16.

To be more precise, the member 21 has a profile which is a portion (slightly more than half) of a circular cylindrical surface 22 whose ends are connected by an undulating profile portion 23.

In the stacking configuration (see FIG. 1), and until the deployed position of the panel 1 relative to the panel 3 is reached (see the description of the deployment kinematics below), the lug 19 is pressed against the cylindrical surface portion 22 by a torsion spring 24 (see FIG. 4) to temporarily lock the pawl 18 against rotation. The pawl 18 is either fastened to the lug 19 or made in one piece with it.

Figure 3:
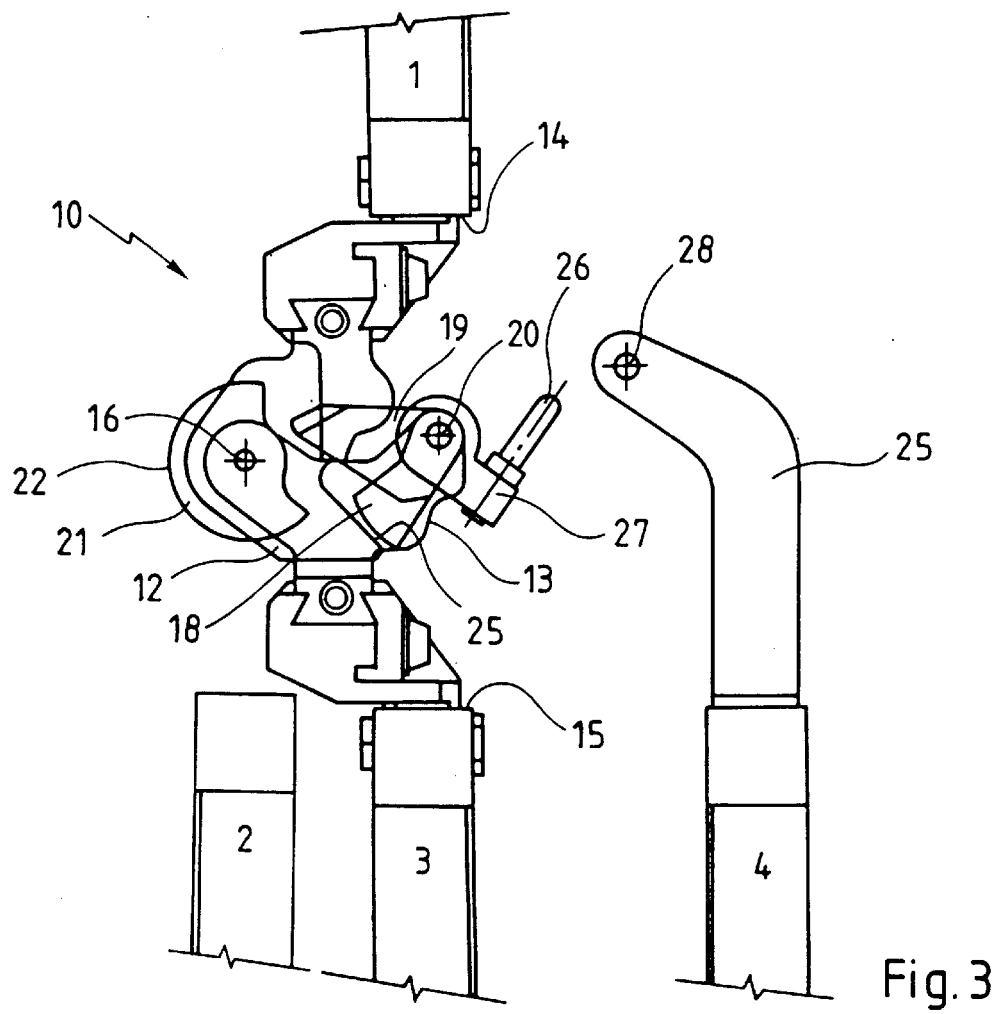

FIG. 3 shows that when the panel 1 reaches the deployed configuration, i.e. when it is in substantially the same plane as the panel 3, the lug 19 escapes from the cylindrical surface portion and from the member 21, and so the pawl 18 and its lug 19 can pivot about the pivot 20, driven by the torsion spring 24 mounted on the pivot 20 and driving the pawl 18.

In this deployed configuration (see FIG. 3) the pawl 18 abuts against a heel-piece 25 of the male yoke 12, immobilizing the two panels 1 and 3 in the deployed configuration.

In other words, the immobilizing means consisting of the pawl 18 provide one-way non-return locking of the panels 1 and 3.

According to the present invention, the locking mechanism 17 further includes a first finger 26 mounted to rotate about the pivot 20 on the female yoke 13 by means of a pivoting support arm 27 constrained to rotate with the pawl 18 and the lug 19.

In a different embodiment the finger 26 could be mounted on or formed directly on the pawl 18.

As described in more detail below, the finger 26 is designed to cooperate with a finger 28 fastened to the panel 4 by means of a fitting 29 to hold the panel 4 stacked onto the panel 3 when the panels 1 and 3 move to their deployed configuration relative to each other.

To be more precise, in this example, to exercise this retaining function, the two fingers 26 and 28 are oriented perpendicularly to each other and abut on each other at the start of the deployment of the panel 1 relative to the panel 3 (see FIG. 2).

The panel 1 to 4 deployment kinematics will now be described.

To prevent damage during the launch phase (caused by vibration), the finger 26 is not in contact with the finger 28 in the stacking configuration (see FIG. 1).

The opening of the panel 1 relative to the panel 3 influences the spring-loaded articulation(s) connecting the panels 3 and 4 in the direction of the deployment of the panel 4 relative to the panel 3. As a result the finger 28 of the panel 4 comes to bear on the finger 26 fastened to the pawl 18 which is immobilized against rotation by the cylindrical surface portion or ramp 22 entrained by the panel 1 (see FIG. 2). The panel 4 can therefore not be deployed laterally and applies little force to the pawl 18 because of the low drive torque of the opposite spring-loaded articulation(s) connecting the panels 3 and 4.

When the panel reaches the 180° deployed configuration (FIG. 3), the pawl 18 escapes from the romp 22 and is retracted by its own driving force (provided by the spring 24) augmented by the bearing force due to the spring-loading of the panel 4.

When it retracts, the pawl 18 locks the articulation 11 connecting the panels 1 and 3 and rotates the finger 26, releasing the finger 28 and thereby allowing the panel 4 to open.

Thus the panel 4 can open only when the panels 1 and 3 are locked in the deployed configuration.

The same principle governs the opening of the panel 2 relative to the panel 3 and of the other lateral panels relative to the in-line panels (not shown in the figures).

Of course, the present invention is in no way limited to the chosen embodiment shown in the figures, but encompasses any variant that may suggest itself to the skilled person.

In particular, the pawl and the heel-piece previously mentioned could have a configuration enabling immobilization of two in-line panels in both directions of relative rotation.

There is claimed:

1. An articulated system, comprising:
    a first inline panel (1);
    a second inline panel (3);
    an articulation (11) having a first articulated member (12) connected to said first inline panel (1), and a second articulated member (13) connected to said second inline panel (3), said first articulated member-and said second articulated member rotate relative to each other about a first articulation axis (16) for deployment of at least said second inline panel from a stacked configuration to a deployed configuration;
    a first side panel (4) connected to said second inline panel (3), said first side panel rotates about a side panel axis for deployment of said first side panel with respect to said second inline panel from a stacked configuration to a deployed configuration, said first side panel having a first restraining member (28); and
    said articulation (11) further having a locking mechanism, including:
        a first control surface (22) that rotates with said first articulated member (12) about the first articulation axis (16);
        a first locking surface (25) that rotates with said first articulated member (12) about the first articulation axis (16);
        a second control surface (19') that rotates about a second articulation axis (20) and abuts said first control surface (22) during deployment of said first inline panel and said second inline panel from the stacked configuration to the deployed,configuration;
        a second locking surface (18') that rotates about the second articulation axis (20) and abuts said first locking surface (25) after deployment of said first inline panel and said second inline panel from the stacked configuration to the deployed configuration to prevent said first inline panel from rotating back to said stacked configuration; and
        a support arm (27) having a second restraining member (26), said support arm (27) and second restraining member (26) rotate about the second articulation axis (20), said second restraining member (26) couples with said first restraining member (28) during deployment of said first inline panel and said second inline panel from the stacked configuration to the deployed configuration, said second restraining member (26) uncouples with said first restraining member (28) after deployment of said first inline panel and said second inline panel from the stacked configuration to the deployed configuration to allow deployment of said first side panel with respect to said second inline panel.

2. The articulated system according to claim 1, wherein said second locking surface (18') abuts said first locking surface (25) to provide only one-way, non-return locking that prevents said first inline panel from rotating back to said stacked configuration.

3. The articulated system according to claim 1, wherein said second control surface (19), said second locking surface (18), and said support arm (27) rotate together as an integral unit about the second articulation axis (20).

4. The articulated system according to claim 2, wherein the first articulation axis (16) and the second articulation axis (20) are parallel, and the side panel axis is perpendicular to the first articulation axis (16) and the second articulation axis (20).

5. The articulated system according to claim 1, wherein
    said articulation includes a lug (19) that rotates about the second articulation axis (20) and a pawl (18) that rotates about the second articulation axis (20);
    said second control surface (19') is formed at a distal end of said lug (19), and said second locking surface (18') is formed at a distal end of said pawl (18); and
    said lug (19) is longer than said pawl (18) such that said second control surface (19') is at a radial distance from the second articulation axis (20) that is greater than a radial distance of said second locking surface (18') from the second articulation axis (20).

6. The articulated system according to claim 3, wherein said first control surface (22) is a partial cylinder that terminates at an undulating profile portion, the undulating profile portion defining a free space; and wherein, during deployment of said first inline panel and said second inline panel from a stacked configuration to a deployed configuration, said second control surface (19') abuts said first control surface (22) until said second partial cylinder terminates at said undulating profile portion, after which said second control surface (19') escapes from said first control surface and rotates into the free space, permitting said second locking surface (18') to rotate into abutment with said first locking surface (25), and permitting said support arm (27) and second restraining member (26) to, rotate and uncouple with said first restraining member (28).

7. The articulated system according to claim 1, wherein said first control surface (22) is at a shorter radial distance from the first articulation axis (16) than said first locking surface (25); and wherein said second control surface (19') is at a longer radial distance from the second articulation axis (20) than said second locking surface (18').

8. The articulated system according to claim 5, wherein said first control surface (22) is at a shorter radial distance from the first articulation axis (16) than said first locking surface (25).

9. The articulated system according to claim 1, wherein said second control surface (19') is offset axially along the second articulation axis (20) from said second locking surface (18').

10. The articulated system according to claim 3, wherein said second control surface (19'), said second locking surface (18'), and said support arm (27) are spring biased for rotation about the second articulation axis (20).

11. An articulated system, comprising:

a first inline panel (1);

a second inline panel (3), said first inline panel rotatable about a first inline panel axis for deployment of said first inline panel with. respect to said second inline panel from a stacked configuration to a deployed configuration;

a first side panel (4), said first side panel rotatable about a first side panel axis for deployment of said first side panel with respect to said second inline panel from a stacked configuration to a deployed configuration; and means for one-way locking said first inline panel and said second inline panel in the deployed configuration and for unlocking said first side panel and said second inline panel from a stacked configuration after deployment of said first inline panel and said second inline panel.

12. An articulated system, comprising:

a first inline panel (1);

a second inline panel (3), said first inline panel rotatable about a first inline panel axis for deployment of said first inline panel with respect to said second inline panel from a stacked configuration to a deployed configuration;

a first side panel (4), said first side panel rotatable about a first side panel axis for deployment of said first side panel with respect to said second inline panel from a stacked configuration to a deployed configuration; and a locking mechanism having a control surface (19) and a locking surface (18) that rotate together about a common axis and that locks said first inline panel and said second inline panel in the deployed configuration and unlocks said first side panel and said second inline panel from a stacked configuration after deployment of said first inline panel and said second inline panel.

13. An articulated system, comprising:

first (1) and second (3) inline panels movable with respect to one another from a folded configuration to a deployed configuration;

at least one side panel (4) movable with respect to said second inline panel from a folded configuration to a deployed configuration; and a lock and release mechanism movable between a first position preventing said side panel from moving to its deployed configuration and a second position in which first and second inline panels are locked to prevent movement thereof toward said folded configuration and in which said side panel is not prevented from moving to its deployed configuration, said lock and release mechanism including:

a first locking surface coupled to said first inline panel and movable with respect to said second inline panel, and a second locking surface, wherein, when said first and second inline panels are in the deployed configuration, said second locking surface engages said first locking surface in compression to prevent said first and second inline panels from reverting back to the folded configuration.

14. An articulated system according to claim 13, wherein said lock and release mechanism includes a first control surface coupled to said first inline panel, and a second control surface, wherein, while said first and second inline panels are being deployed from the folded configuration to the deployed configuration, said second control surface engages said first control surface to prevent said second locking surface from engaging said first locking surface.

15. An articulated system according to claim 14, wherein said lock and release mechanism includes a support arm that prevents said side panel from moving to its deployed configuration while said first and second inline panels are being deployed from the folded configuration to the deployed configuration, and wherein said second locking surface, said second control surface, and said support arm rotate together as an integral unit about a common axis.

* * * * *